Feb. 21, 1956
F. L. GEARY
2,735,262
SUPPORT MEANS
Filed April 28, 1952
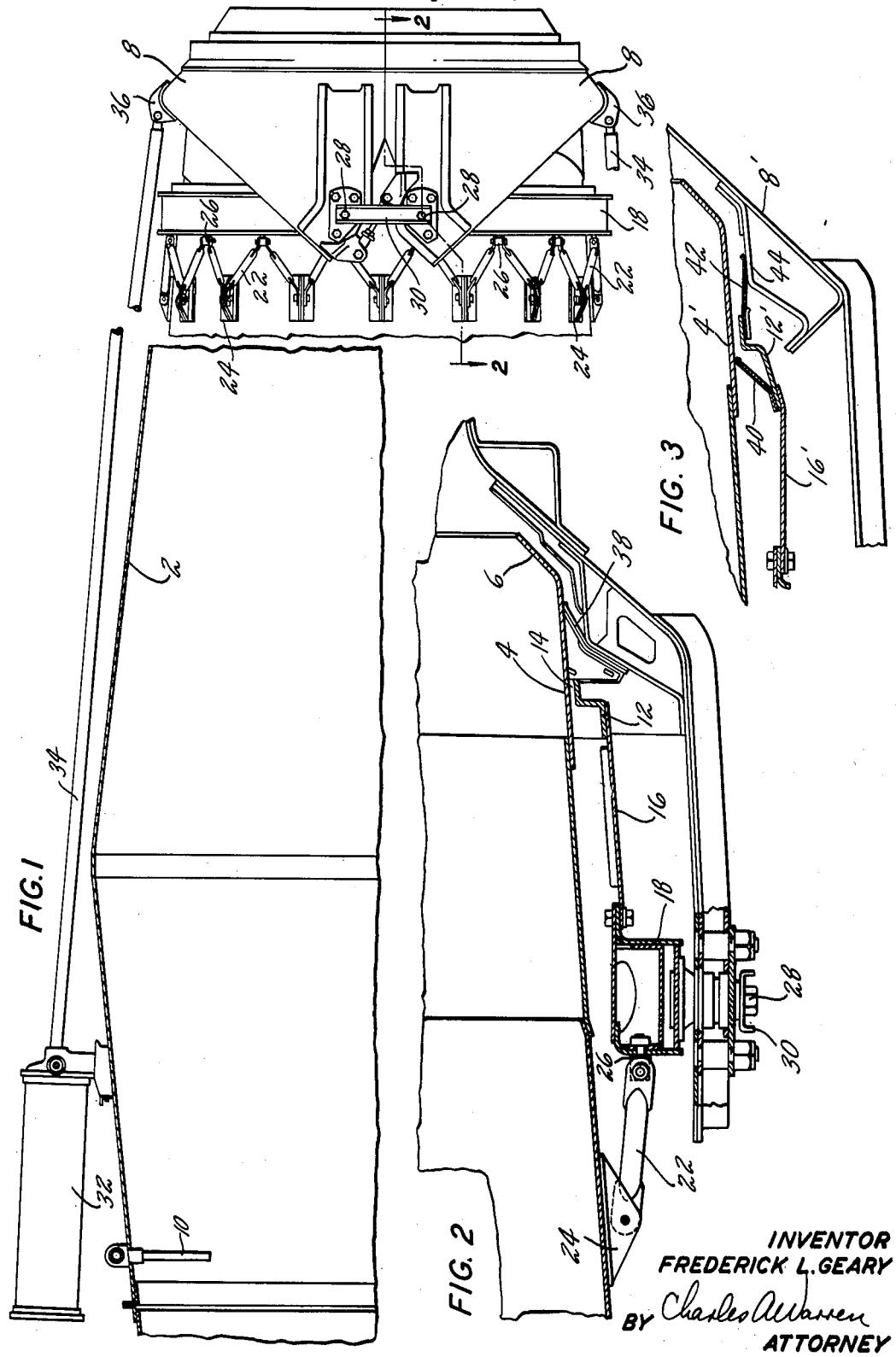
INVENTOR
FREDERICK L. GEARY
BY Charles A. Warren
ATTORNEY United States Patent Office 2,735,262
Patented Feb. 21, 1956

2,735,262

SUPPORT MEANS

Frederick L. Geary, Springfield, Mass., assignor to United Aircraft Corporation, East Hartford, Conn., a corporation of Delaware Application April 28, 1952, Serial No. 284,789

14 Claims. (Cl. 60—35.6)

This invention relates to thrust nozzles and particularly to an arrangement for retaining the shape and dimension of these nozzles.

The thrust nozzles of jet engines operate at high temperatures, in many instances at temperatures which reduce the tensile strength of the nozzle material to such an extent that the pressures existing within the nozzle can distort it. Furthermore, these nozzles are subject to warping at the temperatures encountered so that the nozzle may lose its desired shape. A feature of this invention is an arrangement by which to support the nozzle against distortion while it is operating hot.

In afterburners the nozzle arrangement is frequently a fixed area nozzle used when the afterburner is "on" and movable flaps or eyelids which are movable inwardly at the end of the fixed nozzle to reduce the effective area of the nozzle, in effect forming a separate smaller area nozzle useful when the afterburner is "off." A feature of the invention is a support for the fixed area nozzle which will be operative while the afterburner is "on" but which will not interfere with the movement of the flaps into or out of operative position.

Other objects and advantages will be apparent from the specification and claims, and from the accompanying drawing which illustrates an embodiment of the invention.

Fig. 1 is a side view partly in elevation and partly in section of an afterburner with the variable area nozzle thereon.

Fig. 2 is a fragmentary sectional view on the line 2—2 of Fig. 1 showing the reinforcement for the fixed area nozzle.

Fig. 3 is a view similar to Fig. 2 showing a modification.

The invention is shown as applied to a duct 2 which may form the afterburner for a jet engine. The downstream end of the duct 2 terminates in a fixed area thrust nozzle 4, the extreme end of which is inturned as at 6. This fixed area nozzle constitutes the discharge end of the duct when the flaps or eyelids 8 are open since in the open position the eyelids are moved out of the flow area of the fixed nozzle and do not in any way impede the flow through this nozzle.

The duct 2 may be provided with fuel through fuel nozzles 10, only one of which is shown, with combustion occurring within the duct 2 downstream of the nozzles. The flaps 8 are in open position so that with combustion occurring in the duct 2 the nozzle 4 and particularly the inturned end 6 is subjected to extreme temperatures resulting from the combustion occurring within the duct.

In order to prevent the nozzle from losing its shape and dimension the latter is surrounded by a ring 12 which at normal temperature is of such a dimension as to provide a clearance space 14 between the nozzle 4 and the ring. The dimension of this space is such that when the nozzle 4 is heated to its operating temperature, the afterburner being "on," and the nozzle tends to go out of round by reason of the loss of strength and the uneven heating the walls of the nozzle will move outwardly into contact with the ring 12 which supports the nozzle in its round shape. The ring stays cool and therefore retains its strength so that it retains its shape. The function of the ring is to support the nozzle when it goes out of round and is enough larger than the nozzle so that the latter contacts the ring only when the nozzle substantially reaches its maximum operating temperature, or when the nozzle becomes distorted. The ring is angle-shaped or Z-shaped in cross-section to provide a relatively rugged support for the nozzle when the latter expands into contact with the ring, the configuration of the ring making it much more rigid than the nozzle itself.

The ring 12 is supported and is also kept substantially cooler than the nozzle because it is not in intimate contact with the nozzle and the ring is supported by axially extending strips 16 which extend in spaced parallel relation to the duct wall to a supporting ring 18, the latter surrounding the duct in spaced relation thereto. It will be apparent that cooling air flowing between the ring 18 and the duct and around the ring will effectively cool the ring 18 and sleeve and will retain the supporting ring 12 at a reasonably cool temperature.

The ring 18 is supported by a number of links 22 arranged in pairs as shown. These links extend from brackets 24 attached to the duct 2 and are pivotally connected at their opposite ends to brackets 26 on the ring 18. As best shown in Fig. 1 each bracket 24 supports a pair of the links with the links diverging so that one link from each bracket 24 connects to one of the brackets 26 on ring 18. With this arrangement the relative expansion between the duct 2 and the ring 18 is permitted without imposing any undesirable stresses on the supporting parts. The ring 18 in addition to supporting the ring 12 also carries pivot pins 28 which support the flaps or eyelids 8 for pivotal movement into and out of operative position. The opposite flaps may be interconnected as by a link 30 so that they will move symmetrically with respect to the axis of the nozzle. The flaps may be moved by any suitable mechanism such as the hydraulic cylinder 32 having a projecting piston rod 34 pivotally connected to brackets 36 on the flaps.

It will be apparent that the supporting strips 16 and the ring 12 are located within the area enclosed by the flaps 8 in such a way as not to interfere with the opening or closing of the flaps in any way. In the arrangement shown in Fig. 2 the flaps carry sealing strips 38 which when the flaps are in the closed position of Fig. 1 will engage with the nozzle 4 downstream of the ring 12 and prevent the flow of hot gas from within the flaps through the space between the flaps and the nozzle, thereby preventing the ring 12 from being heated from the flow of hot gas.

In the arrangement shown in Fig. 3 the nozzle 4' has its surrounding supporting ring 12' which in turn is held in position by the strips 16'. In this arrangement the escape of hot gas over the outer surface of the nozzle 4' is prevented by a sealing strip 40 carried by the ring 12 upstream of its point of engagement with the nozzle and another sealing ring 42 carried by the ring 12' and engaging with a ring segment 44 carried by the flap 8'.

With this arrangement it will be apparent that the ring 12 which functions to support the thrust nozzle 4 against expansion and distortion while the nozzle is operating hot is supported in such a way that it will be kept substantially colder than the nozzle and is also supported in such a way that it will not interfere with the opening and closing of the variable area nozzle.

It is to be understood that the invention is not limited to the specific embodiment herein illustrated and described, but may be used in other ways without departure from its spirit as defined by the following claims.

I claim:

1. A thrust nozzle through which hot gas is discharged as a jet, said nozzle being in the form of a thin-walled sleeve, and a ring substantially shorter than the nozzle and surrounding said nozzle, the downstream end of said ring terminating adjacent to and upstream of the downstream end of the nozzle, said ring being closely spaced from said nozzle when the latter is cold and in contact therewith when the nozzle is heated, the space between the nozzle and ring being such that when the nozzle is in operation the thermal expansion will expand the sleeve into engagement with the ring to support the nozzle against distortion, and means for supporting said ring.

2. A thrust nozzle through which hot gas is discharged as a jet, said nozzle being in the form of a thin-walled sleeve, and a supporting ring substantially shorter than the nozzle and surrounding and closely spaced radially from said nozzle when the nozzle is cold and in engagement with the nozzle when the nozzle is hot, the downstream end of the ring terminating adjacent to and upstream of the downstream end of the nozzle, the space being such that when the nozzle is in operation the thermal expansion will expand the sleeve into engagement with the ring to support the nozzle against distortion, and means for supporting said ring from a point spaced substantially from the line of contact between the ring and the nozzle.

3. In a device of the class described, a thrust nozzle in the form of a thin-walled sleeve through which hot gas is discharged as a jet, a duct to which the nozzle is connected, and through which gas reaches the nozzle, a ring substantially shorter than the nozzle surrounding said nozzle and terminating at its lower and adjacent to and upstream of the downstream end of the nozzle, said ring being in peripheral contact with the nozzle when the latter is hot and being closely spaced from said nozzle when the latter is cold, the relative radial dimensions of the nozzle and ring being such that when the nozzle is in operation the thermal expansion thereof will cause the nozzle to engage with the ring.

4. In a device of the class described, a thrust nozzle in the form of a thin-walled sleeve through which hot gas is discharged as a jet, a duct to which the nozzle is connected, and through which gas reaches the nozzle, a ring substantially shorter than the nozzle surrounding said nozzle and terminating at its lower end adjacent to and upstream of the downstream end of the nozzle, said ring being in peripheral contact with the nozzle when the latter is hot and being closely spaced from said nozzle when the latter is cold, the relative radial dimensions of the nozzle and ring being such that when the nozzle is in operation the thermal expansion thereof will cause the nozzle to engage with the ring, and means connected to the duct and extending downstream is spaced relation to the duct for supporting the ring.

5. An afterburner arrangement including a duct through which hot gas flows, a fuel supply means in the duct, a thrust nozzle mounted on the downstream end of said duct, a variable area nozzle mounted in surrounding relation to the thrust nozzle and movable into a position overlying the end of the thrust nozzle for decreasing the effective area of the thrust nozzle, a ring surrounding the thrust nozzle in closely spaced relation thereto, said ring being slightly larger than the thrust nozzle to such an extent that the thrust nozzle will expand by thermal expansion into engagement with the ring when the thrust nozzle is in operation, the ring supporting the thrust nozzle against distortion and said ring being located within and surrounded by the variable area nozzle.

6. An afterburner arrangement including a duct through which hot gas flows, a fuel supply means in the duct, a thrust nozzle connected to the end of the duct for the discharge of the hot gas therethrough, a variable area nozzle mounted in surrounding relation to the thrust nozzle and movable into a position overlying the end of the thrust nozzle for decreasing the effective area of the thrust nozzle, a ring surrounding the thrust nozzle in closely spaced relation thereto, said ring being slightly larger than the thrust nozzle to such an extent that the thrust nozzle will expand by thermal expansion into engagement with the ring when the thrust nozzle is in operation, the ring supporting the thrust nozzle against distortion and said ring being located within and surrounded by the variable area nozzle, and a supporting means extending around the duct and supporting said ring and said variable area nozzle.

7. An afterburner arrangement including a duct through which hot gas flows, a fuel supply means in the duct, a thrust nozzle mounted on the downstream end of said duct, a variable area nozzle mounted in surrounding relation to the thrust nozzle and movable into a position overlying the end of the thrust nozzle for decreasing the effective area of the thrust nozzle, a ring surrounding the thrust nozzle in closely spaced relation thereto, said ring being slightly larger than the thrust nozzle to such an extent that the thrust nozzle will expand by thermal expansion into engagement with the ring when the thrust nozzle is in operation, the ring supporting the thrust nozzle against distortion and said ring being located within and surrounded by the variable area nozzle, and sealing means around said thrust nozzle to close the space between the thrust nozzle and the variable area nozzle, thereby to minimize the flow of hot gas past the ring.

8. An afterburner arrangement including a duct through which hot gas flows, a fuel supply means in the duct, a thrust nozzle mounted on the downstream end of said duct, a variable area nozzle mounted in surrounding relation to the thrust nozzle and movable into a position overlying the end of the thrust nozzle for decreasing the effective area of the thrust nozzle, a ring surrounding the thrust nozzle in closely spaced relation thereto, said ring being slightly larger than the thrust nozzle to such an extent that the thrust nozzle will expand by thermal expansion into engagement with the ring when the thrust nozzle is in operation, the ring supporting the thrust nozzle against distortion and said ring being located within and surrounded by the variable area nozzle, a supporting means extending around the duct and supporting said ring and said variable area nozzle, and sealing means around said thrust nozzle to close the space between the thrust nozzle and the variable area nozzle, thereby to minimize the flow of hot gas past the ring.

9. A thrust nozzle through which hot gas is discharged as a jet, said nozzle being in the form of a thin-walled sleeve, a duct to which the nozzle is connected and through which gas reaches the nozzle and a ring surrounding and spaced from said nozzle when the parts are cold, the space being such that when the nozzle is in operation the thermal expansion will expand the nozzle into engagement with the ring, said thrust nozzle having an inturned edge at the discharge end, and said ring being located adjacent to and upstream of said inturned edge.

10. A thrust nozzle through which hot gas is discharged as a jet, said nozzle being in the form of a thin-walled sleeve, a duct to which the nozzle is connected and through which gas reaches the nozzle, and a ring surrounding and spaced from said nozzle when the parts are cold, the space being such that when the nozzle is in operation the thermal expansion will expand the nozzle into engagement with the ring such that the nozzle is supported against distortion, and means connected to said duct at a point spaced substantially from the point of contact between the ring and the nozzle and extending to said ring for supporting it, said thrust nozzle having an inturned edge at the discharge end, and said ring being located adjacent to and upstream of said inturned edge.

11. In a device of the class described, a thrust nozzle through which hot gas is discharged as a jet, a duct to which the nozzle is connected and through which gas reaches the nozzle, a variable area nozzle mounted in surrounding relation to the thrust nozzle, and movable into a position overlying the end of the thrust nozzle and decreasing the effective area thereof, a ring surrounding the thrust nozzle in closely spaced relation thereto, the dimension of said ring being such that the thrust nozzle in operation will expand by thermal expansion into contact with said ring such that the thrust nozzle will be supported against distortion, a second ring surrounding the thrust nozzle upstream of said first ring, supporting means secured to the duct and extending in a downstream direction to engage with and support the second ring, and axially extending supporting means between said first and second rings.

12. In a device of the class described, a thrust nozzle through which hot gas is discharged as a jet, a duct to which the nozzle is connected and through which gas reaches the nozzle, a variable area nozzle mounted in surrounding relation to the thrust nozzle, and movable into a position overlying the end of the thrust nozzle and decreasing the effective area thereof, a ring surrounding the thrust nozzle in closely spaced relation thereto, the dimension of said ring being such that the nozzle in operation will expand by thermal expansion into contact with said ring, said ring being located within the variable area nozzle, a second ring surrounding the duct upstream of said first ring for supporting said variable area nozzle, supporting means secured to the duct upstream of said second ring and extending in a downstream direction to engage with and support the second ring, and axially extending supporting means between said first and second rings.

13. In a device of the class described, a thrust nozzle through which hot gas is discharged as a jet, a duct to which the nozzle is connected and through which gas reaches the nozzle, a ring surrounding said nozzle, said ring being spaced from the nozzle at normal temperatures, the relative radial dimensions of the nozzle and ring being such that when the nozzle is in operation the ring will be moved by thermal expansion into engagement with the ring, a second ring surrounding the duct upstream of said first ring, supporting means secured to the duct and engaging with said second ring, and axially extending supporting means between said first and second rings.

14. A thrust nozzle through which hot gas is discharged as a jet, a duct to which the nozzle is connected and through which gas reaches the nozzle, said nozzle being in the form of an annulus, and a ring surrounding and spaced from said nozzle when the parts are cold, the space being such that when the nozzle is in operation the thermal expansion will expand the nozzle into engagement with the ring such that the nozzle is supported against distortion, a second ring surrounding the duct upstream of said first ring, supporting means secured to the duct upstream of said second ring and extending between said duct and said second ring, and axially extending supporting means between said first and second rings and out of contact with the nozzle.

References Cited in the file of this patent

UNITED STATES PATENTS 2,603,060   Brown _____ July 15, 1952